US012426007B1

(12) United States Patent
Aguilar et al.

(10) Patent No.: US 12,426,007 B1
(45) Date of Patent: Sep. 23, 2025

(54) POWER OPTIMIZED GEOLOCATION

(71) Applicant: Samsara Inc., San Francisco, CA (US)

(72) Inventors: Ernie Aguilar, Austin, TX (US); David Gal, Oakland, CA (US); Eli Peer, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 490 days.

(21) Appl. No.: 17/931,354

(22) Filed: Sep. 12, 2022

Related U.S. Application Data

(60) Provisional application No. 63/366,319, filed on Jun. 13, 2022, provisional application No. 63/363,920, filed on Apr. 29, 2022.

(51) Int. Cl.
*H04W 24/00* (2009.01)
*G01S 19/07* (2010.01)
*H04W 64/00* (2009.01)
*H04W 72/51* (2023.01)

(52) U.S. Cl.
CPC ........... *H04W 64/006* (2013.01); *G01S 19/07* (2013.01); *H04W 72/51* (2023.01)

(58) Field of Classification Search
CPC .... H04W 64/006; H04W 72/151; G01S 19/07
USPC ...................................... 455/456.1
See application file for complete search history.

(56) References Cited

U.S. PATENT DOCUMENTS

| 4,671,111 | A  | 6/1987  | Lemelson        |
|-----------|----|---------|-----------------|
| 5,825,283 | A  | 10/1998 | Camhi           |
| 5,910,987 | A  | 6/1999  | Ginter et al.   |
| 5,917,433 | A  | 6/1999  | Keillor et al.  |
| 6,064,299 | A  | 5/2000  | Lesesky et al.  |
| 6,098,048 | A  | 8/2000  | Dashefsky et al.|
| 6,157,864 | A  | 12/2000 | Schwenke et al. |
| 6,253,129 | B1 | 6/2001  | Jenkins et al.  |

(Continued)

FOREIGN PATENT DOCUMENTS

| CN | 111047179 A       | 4/2020  |
|----|-------------------|---------|
| DE | 10 2004 015 221 A1| 10/2005 |

(Continued)

OTHER PUBLICATIONS

US 11,450,210 B2, 09/2022, Tsai et al. (withdrawn)

(Continued)

*Primary Examiner* — Temica M Beamer
(74) *Attorney, Agent, or Firm* — Knobbe, Martens, Olson & Bear, LLP

(57) ABSTRACT

An object tracking device, such as may be attached to a trailer to track movements of the trailer, may have various communication capabilities, such as cellular/LTE, Wi-Fi and GPS, which each have varying power requirements. A power optimization routine determines which communications should be performed to conserve battery while also providing frequent location updates. The routine determines if another plugged in tracking device is within low power Bluetooth (BLE) range and, if so, communications location via that device. If not, a Wi-Fi scan is performed and a lookup table is consulted for the corresponding location of any identified Wi-Fi access points. If location data cannot be found for an identified Wi-Fi access point, GPS location of the device is determined and the lookup table is updated to include the GPS location of the Wi-Fi access point.

19 Claims, 9 Drawing Sheets

(56) References Cited

U.S. PATENT DOCUMENTS

| | | |
|---|---|---|
| 6,317,668 B1 | 11/2001 | Thibault et al. |
| 6,411,203 B1 | 6/2002 | Lesesky et al. |
| 6,421,590 B2 | 7/2002 | Thibault |
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 6,977,612 B1 | 12/2005 | Bennett |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,243,371 B1 | 7/2007 | Kasper et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,891,012 B1 | 2/2011 | Kiel et al. |
| 7,904,714 B2 | 3/2011 | Lee et al. |
| 7,933,840 B2 | 4/2011 | Zank |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,037,313 B2 | 10/2011 | Hamalainen et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,621,576 B2 | 12/2013 | Jureczki et al. |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B2 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,172,713 B2 | 10/2015 | Joffe et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,535,857 B2 | 1/2017 | Dabbiere |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,034,130 B2 | 7/2018 | DeLuca et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,121,118 B1 | 11/2018 | Kim et al. |
| 10,127,810 B2 | 11/2018 | Durie, Jr. et al. |
| 10,157,321 B2 | 12/2018 | Becker et al. |
| 10,163,107 B1 | 12/2018 | White et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,277,455 B2 | 4/2019 | Erdmann |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,382,897 B1 | 8/2019 | Lanes et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,567,387 B1 | 2/2020 | Trinh et al. |
| 10,573,183 B2 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,645,066 B2 | 5/2020 | Swahn |
| 10,652,335 B2 | 5/2020 | Botticelli |

(56) References Cited

U.S. PATENT DOCUMENTS

| | | | |
|---|---|---|---|
| 10,715,976 B2 | 7/2020 | Hoffner et al. | |
| 10,749,700 B2 | 8/2020 | Raleigh et al. | |
| 10,762,363 B2 | 9/2020 | Watanabe | |
| 10,782,691 B2 | 9/2020 | Suresh et al. | |
| 10,788,990 B2 | 9/2020 | Kim et al. | |
| 10,789,840 B2 | 9/2020 | Boykin et al. | |
| 10,798,522 B1 | 10/2020 | Benjamin et al. | |
| 10,803,496 B1 | 10/2020 | Hopkins | |
| 10,818,109 B2 | 10/2020 | Palmer et al. | |
| 10,827,324 B1 * | 11/2020 | Hajimiri | G06K 7/10366 |
| 10,843,659 B1 | 11/2020 | Innocenzi et al. | |
| 10,848,670 B2 | 11/2020 | Gatti et al. | |
| 10,878,030 B1 | 12/2020 | Lambert et al. | |
| 10,969,852 B2 | 4/2021 | Tuan et al. | |
| 10,979,871 B2 | 4/2021 | Hajimiri et al. | |
| 10,999,269 B2 | 5/2021 | Bicket et al. | |
| 10,999,374 B2 | 5/2021 | ElHattab et al. | |
| 11,007,846 B2 | 5/2021 | Badger et al. | |
| 11,046,205 B1 | 6/2021 | Govan et al. | |
| 11,069,257 B2 | 7/2021 | Palmer et al. | |
| 11,080,568 B2 | 8/2021 | ElHattab et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,128,130 B2 | 9/2021 | Jain et al. | |
| 11,128,636 B1 | 9/2021 | Jorasch et al. | |
| 11,131,986 B1 | 9/2021 | Gal et al. | |
| 11,132,853 B1 | 9/2021 | Akhtar et al. | |
| 11,133,113 B2 | 9/2021 | DeBates et al. | |
| 11,137,744 B1 | 10/2021 | Heddleston et al. | |
| 11,142,175 B2 | 10/2021 | Chow et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,204,637 B2 | 12/2021 | Tuan et al. | |
| 11,245,517 B1 | 2/2022 | Tsarfati et al. | |
| 11,260,878 B2 | 3/2022 | Palmer et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,364,386 B2 | 6/2022 | Ibarrola et al. | |
| 11,365,980 B1 | 6/2022 | Akhtar et al. | |
| 11,374,761 B2 | 6/2022 | Kapinos et al. | |
| 11,386,325 B1 | 7/2022 | Srinivasan et al. | |
| 11,436,844 B2 | 9/2022 | Carruthers et al. | |
| 11,451,610 B1 | 9/2022 | Saunders et al. | |
| 11,451,611 B1 | 9/2022 | Saunders et al. | |
| 11,460,507 B2 | 10/2022 | Lloyd et al. | |
| 11,464,079 B1 | 10/2022 | Aschenbener et al. | |
| 11,479,142 B1 | 10/2022 | Govan et al. | |
| 11,494,921 B2 | 11/2022 | ElHattab et al. | |
| 11,522,857 B1 | 12/2022 | Symons et al. | |
| 11,532,169 B1 | 12/2022 | Hassan et al. | |
| 11,558,449 B1 | 1/2023 | Bicket et al. | |
| 11,595,632 B2 | 2/2023 | Tsai et al. | |
| 11,599,097 B1 | 3/2023 | Gal et al. | |
| 11,606,736 B1 | 3/2023 | Lloyd et al. | |
| 11,611,621 B2 | 3/2023 | ElHattab et al. | |
| 11,615,141 B1 | 3/2023 | Hoye et al. | |
| 11,620,909 B1 | 4/2023 | Tsai et al. | |
| 11,627,252 B2 | 4/2023 | Delegard et al. | |
| 11,641,388 B1 | 5/2023 | Saunders et al. | |
| 11,641,604 B1 | 5/2023 | Lloyd | |
| 11,643,102 B1 | 5/2023 | Calmer et al. | |
| 11,659,060 B2 | 5/2023 | Davis et al. | |
| 11,665,223 B1 | 5/2023 | Duffield et al. | |
| 11,669,714 B1 | 6/2023 | Akhtar et al. | |
| 11,671,478 B1 | 6/2023 | Saunders et al. | |
| 11,674,813 B1 | 6/2023 | Chung et al. | |
| 11,675,042 B1 | 6/2023 | Lloyd et al. | |
| 11,683,579 B1 | 6/2023 | Symons et al. | |
| 11,688,211 B1 | 6/2023 | Calmer et al. | |
| 11,694,317 B1 | 7/2023 | Jain et al. | |
| 11,704,984 B1 | 7/2023 | ElHattab et al. | |
| 11,709,500 B2 | 7/2023 | Lloyd et al. | |
| 11,710,409 B2 | 7/2023 | Nanda et al. | |
| 11,720,087 B1 | 8/2023 | Heddleston et al. | |
| 11,727,054 B2 | 8/2023 | Grandhi et al. | |
| 11,731,469 B1 | 8/2023 | McGillan | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,752,895 B1 | 9/2023 | Govan et al. | |
| 11,756,346 B1 | 9/2023 | Wu et al. | |
| 11,756,351 B1 | 9/2023 | Akhtar et al. | |
| 11,758,096 B2 | 9/2023 | Shah et al. | |
| 11,776,328 B2 | 10/2023 | Yang et al. | |
| 11,780,446 B1 | 10/2023 | Srinivasan et al. | |
| 11,782,930 B2 | 10/2023 | McGee et al. | |
| 11,787,413 B2 | 10/2023 | Tsai et al. | |
| 11,798,187 B2 | 10/2023 | Zaheer et al. | |
| 11,798,298 B2 | 10/2023 | Hassan et al. | |
| 11,800,317 B1 | 10/2023 | Dugar et al. | |
| 11,838,884 B1 | 12/2023 | Dergosits et al. | |
| 11,842,577 B1 | 12/2023 | Harrison et al. | |
| 11,847,911 B1 | 12/2023 | ElHattab et al. | |
| 11,855,801 B1 | 12/2023 | Stevenson et al. | |
| 11,861,955 B1 | 1/2024 | Dubin et al. | |
| 11,863,712 B1 | 1/2024 | Young et al. | |
| 11,866,055 B1 | 1/2024 | Srinivasan et al. | |
| 11,868,919 B1 | 1/2024 | Zhang et al. | |
| 11,875,580 B2 | 1/2024 | Hassan et al. | |
| 11,875,683 B1 | 1/2024 | Tsai et al. | |
| 11,890,962 B1 | 2/2024 | Govan et al. | |
| 11,937,152 B2 | 3/2024 | Hajimiri et al. | |
| 11,938,948 B1 | 3/2024 | Davis et al. | |
| 11,959,772 B2 | 4/2024 | Robbins et al. | |
| 11,974,410 B1 | 4/2024 | Lin et al. | |
| 11,975,685 B1 | 5/2024 | Innocenzi et al. | |
| 11,989,001 B1 | 5/2024 | ElHattab et al. | |
| 11,995,546 B1 | 5/2024 | Srinivasan et al. | |
| 11,997,181 B1 | 5/2024 | Davis et al. | |
| 12,000,940 B1 | 6/2024 | Lloyd et al. | |
| 12,106,613 B2 | 10/2024 | Calmer et al. | |
| 12,117,546 B1 | 10/2024 | Lloyd et al. | |
| 12,126,917 B1 | 10/2024 | Shemet et al. | |
| 12,128,919 B2 | 10/2024 | Calmer et al. | |
| 12,140,445 B1 | 11/2024 | Akhtar et al. | |
| 12,150,186 B1 | 11/2024 | Aguilar et al. | |
| 12,165,360 B1 | 12/2024 | Jain et al. | |
| 12,168,445 B1 | 12/2024 | Srinivasan et al. | |
| 12,172,653 B1 | 12/2024 | Akhtar et al. | |
| 12,179,629 B1 | 12/2024 | Govan et al. | |
| 12,197,610 B2 | 1/2025 | Wen et al. | |
| 12,213,090 B1 | 1/2025 | Dergosits et al. | |
| 12,228,944 B1 | 2/2025 | Dubin et al. | |
| 12,253,617 B1 | 3/2025 | Aguilar et al. | |
| 12,256,021 B1 | 3/2025 | Torres et al. | |
| 12,260,616 B1 | 3/2025 | Rajan et al. | |
| 12,269,498 B1 | 4/2025 | Rommel et al. | |
| 12,289,181 B1 | 4/2025 | Stevenson et al. | |
| 12,306,010 B1 | 5/2025 | Rommel et al. | |
| 2002/0061758 A1 | 5/2002 | Zarlengo et al. | |
| 2002/0128751 A1 | 9/2002 | Engstrom et al. | |
| 2002/0169850 A1 | 11/2002 | Batke et al. | |
| 2003/0081935 A1 | 5/2003 | Kirmuss | |
| 2003/0154009 A1 | 8/2003 | Basir et al. | |
| 2004/0093264 A1 | 5/2004 | Shimizu | |
| 2004/0107361 A1 | 6/2004 | Redan et al. | |
| 2004/0236476 A1 | 11/2004 | Chowdhary | |
| 2004/0236596 A1 | 11/2004 | Chowdhary et al. | |
| 2005/0131585 A1 | 6/2005 | Luskin et al. | |
| 2005/0131646 A1 | 6/2005 | Camus | |
| 2005/0286774 A1 | 12/2005 | Porikli | |
| 2006/0053295 A1 | 3/2006 | Madhusudan et al. | |
| 2006/0167591 A1 | 7/2006 | McNally | |
| 2007/0050108 A1 | 3/2007 | Larschan et al. | |
| 2007/0173991 A1 | 7/2007 | Tenzer et al. | |
| 2008/0252487 A1 | 10/2008 | McClellan et al. | |
| 2008/0261622 A1 | 10/2008 | Lee et al. | |

(56) References Cited

U.S. PATENT DOCUMENTS

| | | |
|---|---|---|
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0072219 A1 | 3/2013 | Zhang et al. |
| 2013/0073112 A1 | 3/2013 | Phelan et al. |
| 2013/0147617 A1 | 6/2013 | Boling et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0310162 A1 | 10/2014 | Collins |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0148077 A1 | 5/2015 | Jelle |
| 2015/0149086 A1 | 5/2015 | Albert, Jr. et al. |
| 2015/0226563 A1 | 8/2015 | Cox et al. |
| 2015/0281889 A1 | 10/2015 | Menendez |
| 2015/0283912 A1 | 10/2015 | Shimizu et al. |
| 2015/0347121 A1 | 12/2015 | Harumoto |
| 2015/0356289 A1 | 12/2015 | Brown et al. |
| 2016/0046298 A1 | 2/2016 | DeRuyck et al. |
| 2016/0100282 A1 | 4/2016 | Pounds et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2016/0381510 A1 | 12/2016 | Reynolds |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0111770 A1 | 4/2017 | Kusens |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0007149 A1 | 1/2018 | Gauglitz |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0025062 A1 | 1/2019 | Young et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0090084 A1 | 3/2019 | Jacobs et al. |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0034928 A1 | 1/2020 | Lim et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0077246 A1 | 3/2020 | Mars et al. |
| 2020/0092682 A1 | 3/2020 | Winograd et al. |
| 2020/0096598 A1 | 3/2020 | Jadav et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0329334 A1 | 10/2020 | Kurian |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0366468 A1 | 11/2020 | Khandani |
| 2020/0371773 A1 | 11/2020 | Kato et al. |
| 2020/0380806 A1 | 12/2020 | Tabata |

(56) References Cited

U.S. PATENT DOCUMENTS

| | | | |
|---|---|---|---|
| 2020/0389415 | A1 | 12/2020 | Zhao et al. |
| 2020/0409929 | A1* | 12/2020 | Kodavarti ............ G06F 16/2365 |
| 2021/0006950 | A1 | 1/2021 | Hajimiri et al. |
| 2021/0097315 | A1 | 4/2021 | Carruthers et al. |
| 2021/0105574 | A1* | 4/2021 | Kim ........................ H04W 4/02 |
| 2021/0133160 | A1* | 5/2021 | Craft ...................... G06F 16/148 |
| 2021/0235410 | A1 | 7/2021 | Hollar et al. |
| 2021/0397908 | A1 | 12/2021 | ElHattab et al. |
| 2022/0059218 | A1* | 2/2022 | Fischer .................. G16H 40/20 |
| 2022/0095698 | A1 | 3/2022 | Talbot et al. |
| 2022/0165073 | A1 | 5/2022 | Shikii et al. |
| 2022/0283051 | A1 | 9/2022 | Weiler |
| 2022/0289203 | A1 | 9/2022 | Makilya et al. |
| 2022/0374737 | A1 | 11/2022 | Dhara et al. |
| 2022/0377517 | A1 | 11/2022 | Altshul et al. |
| 2023/0077207 | A1 | 3/2023 | Hassan et al. |
| 2023/0104403 | A1 | 4/2023 | Erez et al. |
| 2023/0153735 | A1 | 5/2023 | Dhara et al. |
| 2023/0169420 | A1 | 6/2023 | Dhara et al. |
| 2023/0219592 | A1 | 7/2023 | Calmer et al. |
| 2023/0221985 | A1 | 7/2023 | Tsirkin |
| 2023/0281553 | A1 | 9/2023 | Singh et al. |
| 2023/0291243 | A1 | 9/2023 | Audet et al. |
| 2023/0298410 | A1 | 9/2023 | Calmer et al. |
| 2024/0003749 | A1 | 1/2024 | Lin et al. |
| 2024/0005678 | A1 | 1/2024 | Hassan et al. |
| 2024/0013423 | A1 | 1/2024 | Zaheer et al. |
| 2024/0063596 | A1 | 2/2024 | Pandian et al. |
| 2024/0146629 | A1 | 5/2024 | Lloyd |
| 2024/0259815 | A1 | 8/2024 | Boyapalle et al. |
| 2025/0002033 | A1 | 1/2025 | Calmer et al. |
| 2025/0054378 | A1* | 2/2025 | Nagy ...................... G08B 21/02 |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

Elias N. Malamas et al. "A survey on industrial vision systems, applications and tools", Sep. 17, 2002, Image and Vision Computing 21, pp. 171-188.

U.S. Appl. No. 18/308,536, Ride Along Loaction Tracking, filed Apr. 27, 2023.

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAIaIQobChMl14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11,

(56) References Cited

OTHER PUBLICATIONS 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

(56) References Cited

OTHER PUBLICATIONS

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score- Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.
Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

(56) References Cited

OTHER PUBLICATIONS

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

(56) References Cited

OTHER PUBLICATIONS

Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "KeepTruckin ELD Training for Drivers" [video], YouTube, Feb. 2, 2018, screenshot in 1 page. URL: https://www.youtube.com/watch?v=LKJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1Jl-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUlmBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.

(56) References Cited

OTHER PUBLICATIONS

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video- Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
U.S. Appl. No. 18/749,408, Connection Throttling in a Low Power Physical Asset Tracking System, filed Jun. 20, 2024.
U.S. Appl. No. 18/752,000, Rolling Encryption and Authentication in a Low Power Physical Asset Tracking SYstem, filed Jun. 24, 2024.
U.S. Appl. No. 18/747,336, Low Power Physical Asset Location Determination, filed Jun. 18, 2024.
U.S. Appl. No. 18/752,307, Dynamic Geofence Generation and Adjustment for Asset Tracking and Monitoring, filed Jun. 24, 2024.
U.S. Appl. No. 18/753,458, Providing Left-Behind Alerts Based on Real-Time Monitoring of Asset Groups, filed Jun. 25, 2024.
U.S. Appl. No. 18/753,571, Dynamic Geofence Management and Alerting For Asset Movement Monitoring, filed Jun. 25, 2024.
U.S. Appl. No. 18/753,948, Dynamic Asset Mismatch Detection and Notification, filed on Jun. 25, 2024.
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.

(56) References Cited

OTHER PUBLICATIONS

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"The 2012 Fiat 500: eco:Drive", Fiat500USA.com, Feb. 14, 2011, in 24 pages. URL: http://www.fiat500usa.com/2011/02/2012-fiat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto is Using AI & MI to Build a Data Platform That Makes Driving Safer and Fleets Smarter" [video], YouTube, Apr. 16, 2018, screenshot in 1 page. URL: https://www.youtube.com/watch?v=UtMlrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutomotoTV, "Fiat ecoDrive System" [video], YouTube, Oct. 6, 2008, screenshot in 1 page URL: https://www.youtube.com/watch?v=AUSb2dBBI8E.

Batchelor, B et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving MonitoringCam", Cetecom, Inc., Feb. 7, 2018, in 9 pages. URL: https://device.report/m/a68e1abef29f58b699489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

(56) References Cited

OTHER PUBLICATIONS

Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess DrivingPerformance", 17th International IEEE Conference on Intelligent Transportation Systems (ITSC), Oct. 2014, in 6 pages.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS One, Apr. 2017, vol. 12(4): e0174959, in 16 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive, "Guide: AI Model Development", Motive Technologies, Inc., accessed on Mar. 29, 2024 [publication date unknown], Document No. 2022Q1_849898994, in 14 pages.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B—Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.

(56) References Cited

OTHER PUBLICATIONS com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=IecIwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 BIGGEST Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
U.S. Appl. No. 18/308,536, Ride Along Location Tracking, filed Apr. 27, 2023.
U.S. Appl. No. 18/468,463, Ride Along Location Tracking, filed Sep. 15, 2023.
U.S. Appl. No. 18/512,497, Ride Along Location Tracking, filed Nov. 17, 2023.
U.S. Appl. No. 18/308,549, Low Power Geofencing, filed Apr. 27, 2023.
U.S. Appl. No. 18/468,478, Low Power Geofencing, filed Sep. 15, 2023.
U.S. Appl. No. 18/830,325, Connection Throttling in a Low Power Physical Asset Tracking System, filed Sep. 10, 2024.
U.S. Appl. No. 18/753,250, Anonymization in a Low Power Physical Asset Tracking System, filed Jun. 25, 2024.
U.S. Appl. No. 18/753,180, Packet Structure in a Low Power Physical Asset Tracking System, filed Jun. 25, 2024.
U.S. Appl. No. 19/051,058, Low Power Physical Asset Location Determination, filed Feb. 11, 2025.
U.S. Appl. No. 18/752,307, Dynamic Geofence Generation adn Adjustment for Asset Tracking and Monitoring, filed Jun. 24, 2024.
U.S. Appl. No. 18/753,458, Providing Left-Behind Alerts Based on Real-Time Monitoring of Asser Groups, filed Jun. 25, 2024.
U.S. Appl. No. 18/753,571, Synamic Geofence Management and Alerting For Asset Movement Monitoring, filed Jun. 25, 2024.
U.S. Appl. No. 18/753,948, Dynamic Asset Mismatch Detection and Notification, filed Jun. 25, 2024.
U.S. Appl. No. 19/203,895, Dynamic Geofence Generation and Adjustment For Asset Tracking and Monitoring, filed May 9, 2025.
U.S. Appl. No. 19/173,719, Encoding and Transmitting Sensor Data in Low Power Broadcasts, filed Apr. 8, 2025.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).

(56) References Cited

OTHER PUBLICATIONS

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

Gallagher, J., "KeepTruckin's Al Focus driving down costs for customers", FreightWaves, Dec. 9, 2019, in 4 pages. URL: https://www.freightwaves.com/news/al-focus-vaults-keeptruckin-higher-on-freighttech-25-list.

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

Ruiz, J. F. et al., "A Lifecyle for Data Sharing Agreements: How it Works Out", In Schiffner, S et al. (eds.), *Privacy Technologies and Policy*, APF 2016, vol. 9857, 2016, pp. 3-20.

\* cited by examiner

POWER OPTIMIZED GEOLOCATION

TECHNICAL FIELD

Embodiments of the present disclosure relate to gateway devices, sensors, systems, and methods that allow for geolocation with improved power efficiency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Tracking the location of unpowered assets can be important but presents several challenges as trackers often rely on battery power, which limits their ability to report their locations frequently while also maintaining sufficient battery life, especially when trackers use relatively high power methods of location determination, such as GPS.

SUMMARY

The systems, methods, and devices described herein each have several aspects, no single one of which is solely responsible for its desirable attributes. Without limiting the scope of this disclosure, several non-limiting features will now be described briefly.

In some embodiments, an object tracking system comprises a GPS receiver configured to detect GPS signals from GPS satellites; a Wi-Fi transceiver configured to wirelessly communicate with Wi-Fi access points; a short-range communication transceiver configured to wirelessly communicate via a short-range communication protocol; a computer readable storage medium having program instructions embodied therein; and one or more processors configured to execute the program instructions to cause the object tracking system to: perform, by the short-range communication transceiver, a scan for one or more location aware devices configured to determine geographic locations of respective devices; in response to establishing communication with a first location aware device, initiate transmission to a backend server, by the first location aware device, of a current geographic location of the first location aware device with an indication that the object tracking system is nearby; in response to failing to identify a location aware device, perform a Wi-Fi access point scan; in response to establishing communication with a first Wi-Fi access point, initiate transmission to a backend server, of an identifier of the Wi-Fi access point, wherein the backend server is configured to lookup the identifier in a database of Wi-Fi access point identifiers and associated geographic locations; and in response to failing to identify a location aware device and failing to identify a Wi-Fi access point, determine a geolocation based on detected GPS signals by the GPS receiver and transmit the requested geolocation to the backend server.

In some embodiments, the power required by the GPS receiver is greater than the power required by the Wi-Fi transceiver, which is greater than the power required by the short-range communication transceiver. In some embodiments, the short-range communication transceiver is configured to wirelessly communicate via Bluetooth. In some embodiments, the location aware tracking device is a vehicle gateway.

In some embodiments, the object tracking system further comprises a cellular transceiver configured to wirelessly communication with cellular base stations, wherein the computer readable storage medium further has instructions embodied therein that, when executed by the one or more processors, cause the object tracking system to: in response to failing to identify a location aware device, failing to identify a Wi-Fi access point, and failing to determine a geolocation based on detected GPS signals, determine an approximate location based on one or more cellular base stations within a communication range of the object tracking system and transmit the approximate location to the backend server.

In some embodiments, the computer readable storage medium further has instructions embodied therein that, when executed by the one or more processors, cause the object tracking system to determine if a location reporting condition is satisfied. In some embodiments, location reporting condition comprises any combination of one or more of: a threshold amount of movement since a last reported location, a time since the last reported location, a time since a last connection to a cloud server, and a time since a last connection to a location aware device. In some embodiments, to determine if the location reporting condition is satisfied, the computer readable storage medium further has instructions embodied therein that, when executed by the one or more processors, cause the object tracking system to: determine that the object tracking system has not experienced more than a threshold amount of movement since the location of the asset gateway was last reported; determine that the object tracking system has determined a GPS location in a first threshold amount of time; and determine that the object tracking system was not connected to a plugged in tracking device in a second threshold amount of time. In some embodiments, the first threshold amount of time is 48 hours.

In some embodiments, the object tracking system is further configured to report an identifier of at least one unknown Wi-Fi access point.

In some embodiments, the object tracking system of claim 1, wherein the database of Wi-Fi access point identifiers and associated geographic locations includes at least one field indicative of entities associated with the Wi-Fi access point identifiers, and wherein looking up the identifier fails if an entity associated with the object tracking system is not associated with the Wi-Fi access point.

In some embodiments, an object tracking system comprises: a GPS receiver configured to detect GPS signals from GPS satellites; a Wi-Fi transceiver configured to wirelessly communicate with Wi-Fi access points; a computer readable storage medium having program instruction embodied therein; and one or more processors configured to execute the program instructions to cause the object tracking system to: identify, using the Wi-Fi transceiver, a Wi-Fi access point within a communication range of the object tracking system based on a received Wi-Fi access point identifier; determine, using GPS signals detected by the GPS receiver, a geographical location of the object tracking system; and transmit the determined geographic location and the Wi-Fi access point identifier to a backend server, wherein the backend server is configured to update an access point location database with the Wi-Fi access point identifier and associated geographic location.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION OF CERTAIN EMBODIMENTS

Figure 1:
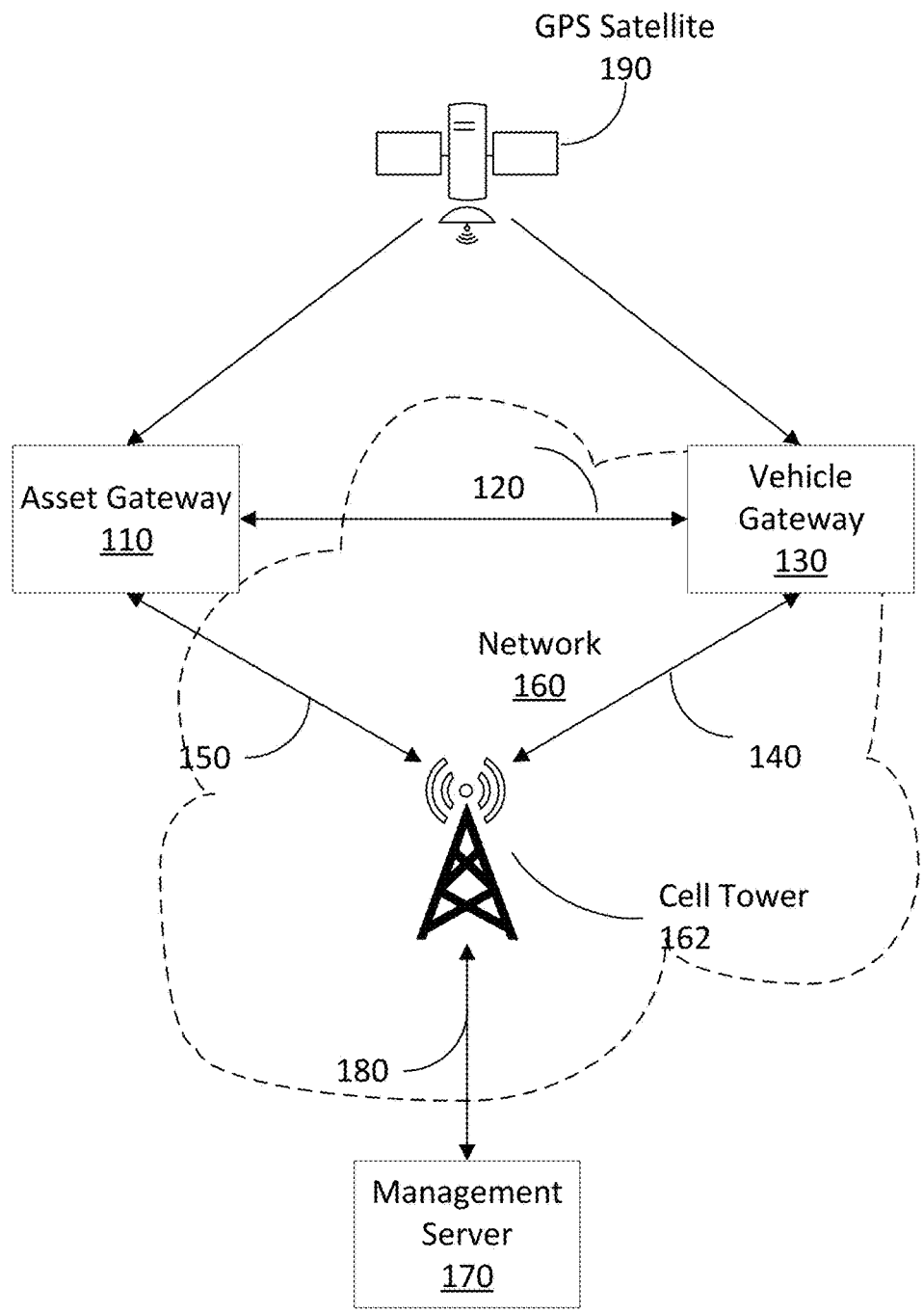
FIG. 1 is an example diagram showing location determination and communication according to some embodiments.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview of Example Embodiments

Tracking objects such as equipment, shipping containers, pallets, trailers, and so forth can provide valuable information. For example, tracking can enable users to determine if an asset has been stolen, determine when an asset is moved, and so forth. Tracking can help users locate lost or misplaced items. For example, users may use a tracking system to determine the location of a piece of equipment on a construction site or the location of a package in a shipping facility or warehouse. However, tracking systems may be difficult to deploy in some situations. For example, object tracking devices that are battery powered, such as might be used to track unpowered objects or objects where connections to a power source are limited, may require frequent charging and/or replacement of the battery.

Reliance on batteries can significantly limit the functionality of object tracking devices. An object tracking device may contain GPS, Wi-Fi, and/or cellular hardware that can be used to determine the location of an object and to report the location of the object to a cloud or backend server over a cellular network (e.g., an LTE network). While this approach can provide location information, its functionality is limited because GPS and cellular operations require significant power and are often associated with additional expense. Thus, users of such an object tracking device choose between long battery life with limited information or more information at the expense of significantly shorter battery life, which may necessitate frequent recharging or battery replacement. Moreover, if an object is lost, stolen, or otherwise can't be reached, frequent check ins may result in the device being tracked for a short period of time before the battery runs out and the object can no longer be tracked. To achieve longer battery life, an object tracking device may limit processing and communication functions, such as by only determining and reporting its geolocation periodically, for example once per day, twice per day, and so forth. Periodic check ins can conserve battery, but at the expense of limited and potentially stale information.

Thus, there is a need to track objects in a manner that provides relatively fresh location information without resulting in unacceptably short battery life. Disclosed herein are systems and methods that enable more efficient and frequent location updates for a tracked object. In some embodiments, such a tracking system can communicate its location using low energy methods when possible, but can fall back to relatively high energy methods when low energy methods are not available. An object tracking device, such as may be attached to a trailer (e.g., a semi-truck trailer) to track movements of the trailer, may have various location determination and communication capabilities, such as GPS, cellular/LTE, WI-FI, Bluetooth, Bluetooth Low Energy, etc., which each have varying power requirements. As discussed herein, a power optimization routine determines which communications should be performed to conserve battery while also providing location updates at an acceptable frequency.

In some embodiments, an object tracking device, which may include an asset gateway, a vehicle gateway, and/or other gateway that is discussed further below, may determine if there is another, plugged in tracking device nearby, for example within low power Bluetooth (BLE) range. If such a tracking device is in range, the object tracking device may rely on the plugged in tracking device to provide location information. For example, the plugged in device may report its own location to a cloud or backend server and may also report an identifier of the object tracking device. The location of the plugged-in tracking device may thereby be associated with the object tracking device, for example according to the systems and methods disclosed in U.S. Provisional Patent Application No. 63/363,917, filed Apr. 29, 2022, the contents of which are hereby incorporated by reference in its entirety and for all purposes.

If there is no nearby plugged in tracking device, the object tracking device may perform a Wi-Fi scan to determine location. In some embodiments, the Wi-Fi scan information may be sent to a third-party service to determine an approximate location of the object tracking device, for example using an application programming interface (API) provided by the third party. For example, one or more identifiers of a Wi-Fi access point (e.g., MAC address, BSS, BSSID, channel, signal strength, SSID, and so forth) in range of the object tracking device may be queried against a list or database of Wi-Fi access point identifiers and corresponding geolocations. Thus, if the identifier of the Wi-Fi access point is included in the Wi-Fi location database, the geolocation associated with that particular Wi-Fi access point may be used as a proxy for location of the object tracking device.

In some embodiments, rather than querying a third-party service, the provider of the object tracking device may maintain a database, file, lookup table, etc., containing Wi-Fi access point identifying information and associated locations, and object tracking devices may query the provider's database, which may be stored on a cloud or backend server. This may be especially desirable in industrial or remote settings. For example, a third-party service may have a great deal of information about Wi-Fi access points in urban or suburban areas, but limited information about remote or industrial areas. However, the provider of an object tracking system may have a lot of information about Wi-Fi access points in such settings.

In some embodiments, an object tracking device can build up a database of Wi-Fi access points and associated locations over time and can store the database in memory on the object tracking device. For example, an object tracking device can perform GPS scans and Wi-Fi scans and can associate discovered Wi-Fi access points with location information determined from the GPS scans. In some embodiments, an object tracking device may not share the database with other devices, cloud servers, and so forth. In other embodiments, object tracking devices can transmit Wi-Fi access point information and location information to a cloud or backend server, which can be used to build a centralized database of Wi-Fi access points and their associated locations. In some cases, entries in the centralized database can be created as a result of a Wi-Fi access point mapping effort, such as having cars drive around relevant areas to detect Wi-Fi access points. In some embodiments, users may choose whether or not to share Wi-Fi access point and location information with a cloud or backend server. In some embodiments, users may share Wi-Fi access point and location information among different devices that the user owns or controls, but may not share the information with other devices.

In some embodiments, rather than or in addition to the object tracking device building its own database of Wi-Fi access points and locations, the object tracking device can receive a database, file, etc., of Wi-Fi access points in a geographical area such as a city, county, state, along a particular route or routes, and so forth. For example, an object tracking device may receive from a cloud or backend server a subset of the entries in a centralized database as discussed above. In some embodiments, an object tracking device may receive all the entries in the centralized database. In some embodiments, an object tracking device may receive periodic updates of the centralized database (or subset thereof), for example over a Wi-Fi or cellular connection.

In some embodiments, a database can include Wi-Fi channel information for the Wi-Fi access points in the database. In some embodiments, the object tracking device can use the channel information to optimize a Wi-Fi scan procedure. For example, an object tracking device can scan all or substantially all available Wi-Fi channels, or can scan only a subset of channels. The number of available Wi-Fi channels can be 11, 12, 13, 14, or some other number, which can vary by region or country. Scanning all channels can consume a significant amount of power, and the energy used for performing a Wi-Fi scan can be reduced by scanning fewer channels. For example, some devices can take about 2.5 s to scan 13 channels for Wi-Fi access points and can consume about 300 µWh of energy. In comparison, scanning one channel using the same device can take about one second and consume about 200 µWh of power. The actual energy consumed, and the energy saved by scanning fewer than all channels, can vary among different devices. In general, performing a Wi-Fi scan can be significantly faster than performing a GPS scan and can consume significantly less power. For example, a typical GPS timeout period can be about 1.5 minutes, about 2 minutes, etc. A GPS scan that times out (e.g., because of lack of signal, too few satellites, noisy signal, etc.) can consume about 10 mWh of power. That is, a GPS scan may consume about an order of magnitude or about two orders of magnitude more power than a Wi-Fi scan.

Often, channel usage is not evenly distributed. For example, Wi-Fi access points can be configured with a default channel which users or owners of the access may choose not to change (and in some cases, may be unaware that changing the channel is possible). Thus, channel usage may be concentrated on only one or two channels. Scanning only one or two channels can allow the object tracking device to detect access points with known locations, without scanning all channels, which can result in significant power savings. In some embodiments, if a scan of only a subset of channels does not find access points with known locations or does not find enough access points with known locations, the object tracking device can be configured to scan all channels. In some embodiments, a threshold number of access points can be required for the object tracking device to use Wi-Fi access points for location determination. For example, the threshold number of access points can be one, two, three, four, or more if desired. In some embodiments, channels that are scanned may be automatically determined, such as based on results of previous Wi-Fi scans. For example, if at least a certain percentage (e.g., 50%, 60%, 70%, 80%, etc.) or a certain number (e.g., 1, 2, 3, 4, 6, 7, etc.) of access points detected in previous scans (e.g., by the particular object tracking device, group of object tracking devices, etc.) were on a single particular channel (e.g., channel 8), then a next Wi-Fi scan may only scan the single particular channel and/or may begin scanning with the single particular channel and only scan additional channels if sufficient access points are not found on the single particular channel. Other methods of automatically identifying most widely used channels may be used.

If the Wi-Fi scan does not find any access points with known locations (or a threshold number of access points with known locations), the object tracking system may determine if there has been movement of the object tracking device since the last check in. For example, the system may use data from an accelerometer or other sensor (for example, a microelectromechanical (MEMS) device) to determine if the object tracking device has undergone more than a threshold amount of motion. If the object has not undergone more than the threshold amount of motion, the object tracking device may report its last determined geolocation (e.g., GPS location or location from nearby Wi-Fi access point). There may be other conditions in which the last determined GPS location is reported, such as if no more than a threshold amount of time has passed since the GPS location was determined, for example no more than 12 hours, no more than 24 hours, no more than 48 hours, or any time period between these numbers, or even more if desired.

If the object tracking device determines that a new location needs to be determined and reported to the cloud server, the system may conduct a GPS scan. If the GPS scan is successful, the system may report the GPS location. If the GPS scan fails or times out, the object tracking device may report a location determined based on nearby cellular sites, e.g., estimating location based on strength of multiple cellular signals received from different cell towers with known locations, coverage areas of nearby cell towers with known locations, times of arrival from multiple cell towers with known locations, and so forth.

In some embodiments, the GPS timeout period can be shortened or extended. A longer timeout period can increase the likelihood of obtaining a location using GPS but can use significantly more power than a shorter timeout period. For example, an object tracking device can be configured to shorten the timeout period if the object tracking device frequently times out when performing GPS scans. For example, an object tracking device may be used indoors where GPS reception is too poor to allow for location determination or may be used along routes that have poor GPS reception (e.g., in dense cities with tall buildings). In some embodiments, an object tracking device can dynamically adjust the GPS timeout period, for example based on a number of satellites in view, signal strength, noise levels, and so forth. Such adjustments can result in significant power savings as the timeout period can be shorted significantly, e.g., from about 1.5 minutes or 2 minutes or 2.5 minutes to about 1 minute, about 30 seconds, or even less if desired.

In some embodiments, the determined location of the object tracking device may be provided to the Wi-Fi location database, along with identifiers of any nearby Wi-Fi access points. Thus, the Wi-Fi location database may be updated so that the additional nearby Wi-Fi access points are usable for future location determinations based on the nearby Wi-Fi access points.

In some embodiments, an object tracking device may be configured to wake from a sleep state in response to detecting motion. The object tracking device may be configured to only report location information in response to waking due to motion on a periodic basis. For example, the object tracking device may only report its location in response to motion every five minutes, ten minutes, thirty minutes, one hour, six hours, twelve hours, twenty four hours, and so forth. The period may be adjusted to any desired period that provides an acceptable balance between battery life and location data frequency.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Management server (or "remote," "backend," "cloud," or "backend server system"): one or more network-accessible servers configured to communicate with vehicle devices (e.g., via a vehicle gateway and/or communication circuitry of a dashcam). A management server is typically configured to communicate with multiple vehicle devices, such as each of a fleet of hundreds, thousands, or more vehicles. Thus, the management server may have context and perspective that individual vehicle devices do not have. For example, the management server may include data associated with a large quantity of vehicles, such as vehicles across a fleet or within a geographic area. Thus, the management server may perform analysis of asset data across multiple vehicles and between groups of vehicles (e.g., comparison of fleets operated by different entities). A backend server system may also include a feedback system that periodically updates event models used by vehicle devices to provide immediate in-vehicle alerts, such as when the backend server has optimized an event model based on analysis of asset data associated with many safety events, potentially across multiple fleets of vehicles.

Vehicle Device: one or more electronic components positioned in or on a vehicle and configured to communicate with a backend server system (also referred to as a "backend" or "cloud"). A vehicle device includes one or more sensors, such as one or more video sensors, audio sensors, accelerometers, global positioning systems (GPS), and the like, which may be housed in a single enclosure (e.g., a dashcam) or multipole enclosures. A vehicle device may include a single enclosure (e.g., a dashcam) that houses multiple sensors as well as communication circuitry configured to transmit sensor data to a backend (or "backend server system"). Alternatively, a vehicle device may include multiple enclosures, such as a dashcam that may be mounted on a front window of a vehicle and a separate vehicle gateway that may be positioned at a different location in the vehicle, such as under the dashboard. In this example implementation, the dashcam may be configured to acquire various sensor data, such as from one or more cameras of the dashcam, and communicate sensor data with the vehicle gateway, which includes communication circuitry configured to communicate with the backend. Vehicle devices also include memory for storing software code that is usable to execute one or more event detection models, such as neural network or other artificial intelligence programming logic, that allow the vehicle device to trigger events without communication with the backend.

Vehicle Gateway (or "VG"): a device positioned in or on a vehicle, which is configured to communicate with one or more sensors in the vehicle, e.g., in a separate dashcam mounted in the vehicle, and to a backend server. In some embodiments, a vehicle gateway can be installed within a vehicle by coupling an interface of the vehicle gateway to an on-board diagnostic (OBD) port of the vehicle. A vehicle gateway may include short-range communication circuitry for communicating using a short-range communication protocol, such as near field communication ("NFC"), Bluetooth ("BT"), Bluetooth Low Energy ("BLE"), Zigbee, etc., for communicating with sensors in the vehicle and/or other devices that are in proximity to the vehicle (e.g., outside of the vehicle).

Asset Gateway (or "AG"): a device positioned in or on an asset, which is configured to communicate with one or more sensors and/or vehicle gateways. In some embodiments, an asset gateway can be configured to communicate with a backend server. An asset gateway may include short-range communication circuitry for communicating using a short-range communication protocol, such as near field communication ("NFC"), Bluetooth ("BT"), Bluetooth Low Energy ("BLE"), Zigbee, etc., for communicating with sensors, vehicle gateways, and/or other devices that in proximity to the asset gateway. In some embodiments, an asset gateway may include a GPS receiver for determining the location of the asset gateway. In some embodiments, an asset gateway may include a cellular radio for communicating with a backend server. In some embodiments, a cellular radio may be used to approximate the location of an asset gateway.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, etc. As used herein, a data source may refer to a table in a relational database, for example.

Example Embodiments

FIG. 1 is an example diagram showing location determination and communication according to some embodiments. As asset gateway 110 and a vehicle gateway 130 are configured to determine location from GPS satellite 190 (which may be a plurality of satellites). The asset gateway 110 and the vehicle gateway 130 can communicate with a management server 170 over a wireless connection via a network 160, which may include any combination of one or more networks, such as a LAN, WAN, PAN, the Internet, etc. In the example of FIG. 1, the network 160 includes cellular tower 140 and or other network access points (e.g., a Wi-Fi network) that provide communications with the remote server 170. The asset gateway 110 and the vehicle gateway 130 can be communicatively coupled via a wireless connection 120, which may be, for example, a BLE connection or other connection suitable for lower power communications. The asset gateway 110 and the vehicle gateway 130 may make determinations about location reporting based at least in part on the presence or absence of the wireless connection 120. For example, if the wireless connection 120 is present, the asset gateway may not determine and report its own location, and the vehicle gateway 130 may report its own location as the location of the asset gateway 110. If the wireless connection 120 is not present, then the asset gateway 110 and the vehicle gateway 130 may separately determine and report their own locations independently of one another.

In some embodiments, a geolocation method performed on an object tracking system can include performing a scan (e.g., a BLE scan) for a nearby location-aware device (e.g., a vehicle gateway) and relying on a found location-aware device to report the location of the object tracking device. If the scan fails, the object tracking system may perform a scan for Wi-Fi access points, and the location of the object tracking system may be determined based on the results of the Wi-Fi scan. If the Wi-Fi scan fails to detect any Wi-Fi access points with known locations, the system may perform a GPS scan. The BLE scan may consume significantly less power than the Wi-Fi scan, which may consume significantly less power than the GPS scan.

Figure 2:
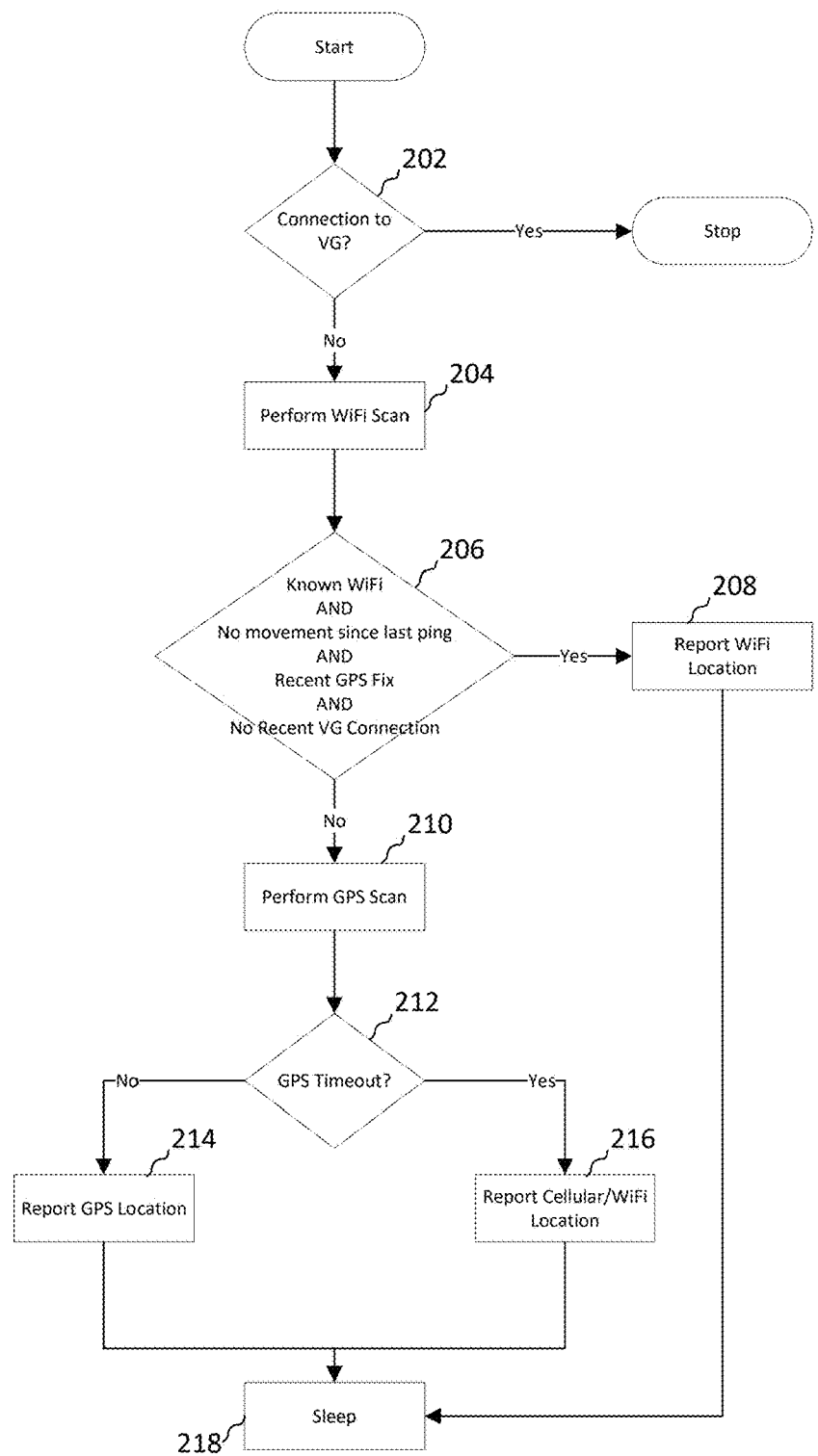
FIG. 2 is a flowchart illustrating a process for low power location determination according to some embodiments.

FIG. 2 is a flowchart illustrating an example process 200 for power-optimized location determination that may be executed on an asset gateway according to some embodiments. At block 202, an asset gateway (e.g., associated with an object being transported by a vehicle, such as an object within a trailer or the trailer itself) may determine if it has a connection to a vehicle gateway (e.g., connected to a vehicle power source). If so, the asset gateway may not determine its own location. If the asset gateway does not have a connection to a vehicle gateway, the asset gateway may, at block 204, perform a Wi-Fi scan to determine nearby Wi-Fi access points.

At decision point 206, the asset gateway may determine whether to report a last known location or to determine its location, such as using GPS. If the asset gateway finds a known Wi-Fi access point, there has been no movement since the last location report, there has been a recent (e.g., within a threshold period of time) GPS location determination, and the asset gateway has not been recently (e.g., within a threshold period of time) connected to a vehicle gateway, the asset gateway may, at block 208, report the known Wi-Fi access point position (or an indication of the known Wi-Fi access point position, such as a MAC address or other identifier of the known Wi-Fi access point) and/or its last determined GPS location. If the conditions at decision point 206 are not satisfied, the asset gateway may, at block 210, perform a GPS scan to determine its location.

At decision point 212, the asset gateway may determine if it has determined a GPS location within a threshold period of time. If the GPS scan did not time out, the asset gateway may, at block 214, report the GPS location and then, at block 218, transition to a sleep state. If, however, the GPS scan did timeout (for example, due to cloud coverage, being inside a building, and so forth), the asset gateway may, at block 216, report its location based on nearby cellular sites and/or Wi-Fi access points and then, at block 218, transition to a sleep state. In some embodiments, the asset gateway may report identifiers of nearby cellular sites and/or Wi-Fi access points, and a backend server may determine a location based on the received information.

FIG. 2 is just one example process for power-optimized location determination by an asset gateway. Other processes and modifications to the example process in FIG. 2 are contemplated. For example, in some embodiments, even if the asset gateway determines at block 202 that it has a connection to a vehicle gateway, the asset gateway may still determine its own location if certain conditions are met. For example, the asset gateway may be configured to determine its own location on a fixed schedule (for example, twice per day, once per day, once every two days, once per week, and so forth). This may be desirable for a number of reasons, for example to ensure that the asset gateway location is correctly reported even if there are software bugs or a malicious actor causing the asset gateway to falsely determine that it has a connection to a vehicle gateway.

In some embodiments, the asset gateway may be associated with a "home" Wi-Fi access point. "Home" may refer to a location where the asset gateway is normally located when not in transit, locations controlled by the user of the asset gateway, and so forth. For example, a "home" may be a factory, warehouse, work site, parking facility, an employee's residence (for example, if an employee normally takes asset gateway home at the end of a work day), and so forth. The home access point may be an access point located at a particular factory, warehouse, worksite, or other facility. In some embodiments, the home access point may be a single access point or multiple access points. For example, a user of the asset gateway may wish to have all or a portion of the access points under the user's control treated as home access points and/or may wish to treat access points at other known locations (e.g., customer sites) treated as home access points. A backend server may be configured to associate entities with access points, for example using a field or fields in a database. At decision point 206, rather than looking for any known Wi-Fi access point, the asset gateway may be configured to determine if there is a nearby home access point. This may be desirable for a number of reasons. For example, access points may move over time for legitimate reasons or could be stolen or spoofed.

Figure 3:
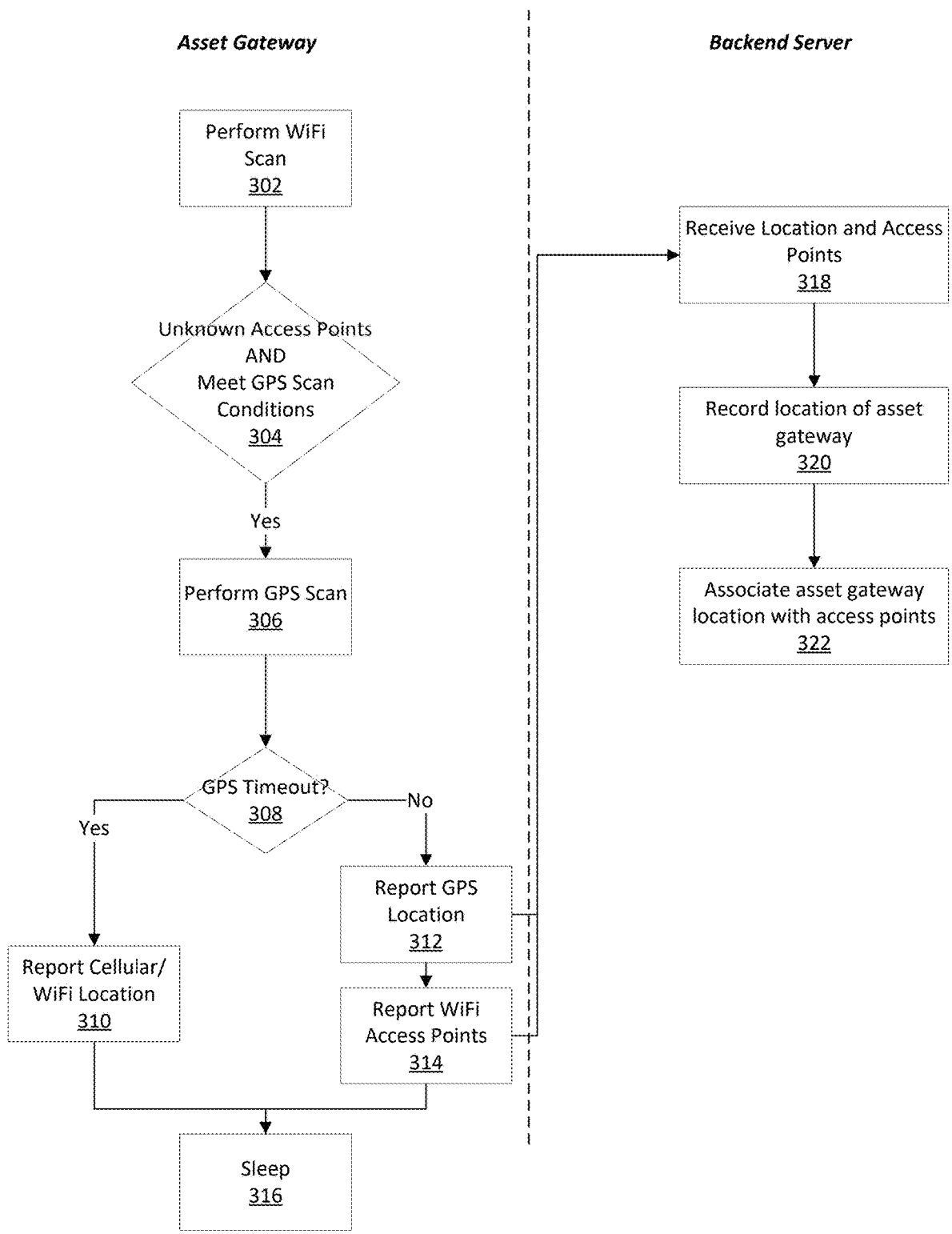
FIG. 3 is a flowchart illustrating a process for updating a location database according to some embodiments.

FIG. 3 is a flowchart illustrating an example process 300 for improving power-optimized location determination over time. In the example of FIG. 3, a backend server is configured to communicate with an asset gateway (or vehicle gateway or other location tracking device) to receive updated Wi-Fi access point information for updating and/or optimizing a Wi-Fi locations database maintained by the backend server. For example, particularly for Wi-Fi access points that are detected by the asset gateway, but for which location information is not included in the access point location database, the process of FIG. 3 may provide location information for that Wi-Fi access point that is usable in determining location of the asset gateway and/or other object tracking devices in the future. Similarly, the process may be used to validate and/or update the location of a Wi-Fi access point, such as to update existing location information associated with the access point in the access point location database with an additional location indicator, an indication that the Wi-Fi access point has been recently moved, and so forth. Depending on the embodiment, the process of FIG. 3 may include fewer or additional blocks and/or the blocks may be performed in order different than as illustrated.

Beginning at block 302, the asset gateway may perform a Wi-Fi scan, such as if the asset gateway does not have a connection with a vehicle gateway (see block 202 of FIG. 2) and/or other acceptable (e.g., recent and accurate) location information. At decision point 304, if unknown access points are located and conditions for conducting a GPS scan are met (for example, as shown at decision point 206 of FIG. 2), the asset gateway may perform a GPS scan at block 306. At decision point 308, the asset gateway may determine if the GPS scan timed out and/or if any GPS location information meets a predetermined level of specificity (e.g., location accuracy of less than x meters). If the GPS timed out, then at block 310, the asset gateway may report cellular site information and/or Wi-Fi location information, and the asset gateway may transition to a sleep state at block 316. If the GPS scan did not time out, the asset gateway may, at blocks 312 and 314, report the GPS location and the detected Wi-Fi access point information (e.g., MAC address, access point name, etc.) to a backend server, and the asset gateway may transition to a sleep state at block 316.

At block 318, the backend server may receive the GPS location and the Wi-Fi access point information. At block 320, the backend server may associate the GPS location with the asset gateway, for example by storing the location in a database. At block 322, the backend server may associate the GPS location of the asset gateway with the unknown Wi-Fi access points (in an access point location database maintained by the backend server), thereby making the unknown access points known access points. Accordingly, when an asset gateway (which may be the same asset gateway or a different asset gateway) encounters the same access points in the future, the access points will be associated with a known location in the access point location database and, thus, the access points may be used to determine the location of the asset gateway, thereby conserving power by eliminating the need for additional location determination processes (e.g., GPS or cellular tower scans).

While FIG. 3 illustrates associating a GPS location of an asset gateway with unknown Wi-Fi access points, in some embodiments, an asset gateway's location may be determined using nearby cell site information (for example, as shown at block 310 of FIG. 3). In some cases, it may be desirable to associate the asset gateway location as determined using cell site information with the unknown Wi-Fi access points, for example in areas where there is no usable GPS signal but there is cellular service.

As shown in FIG. 3, a backend server can be configured to receive location information and access point information from an asset gateway and to associate the asset gateway location with the access points. In some embodiments, however, it may be desirable to create a database of locations on the asset gateway itself, which the asset gateway can query to determine its location.

Figure 4:
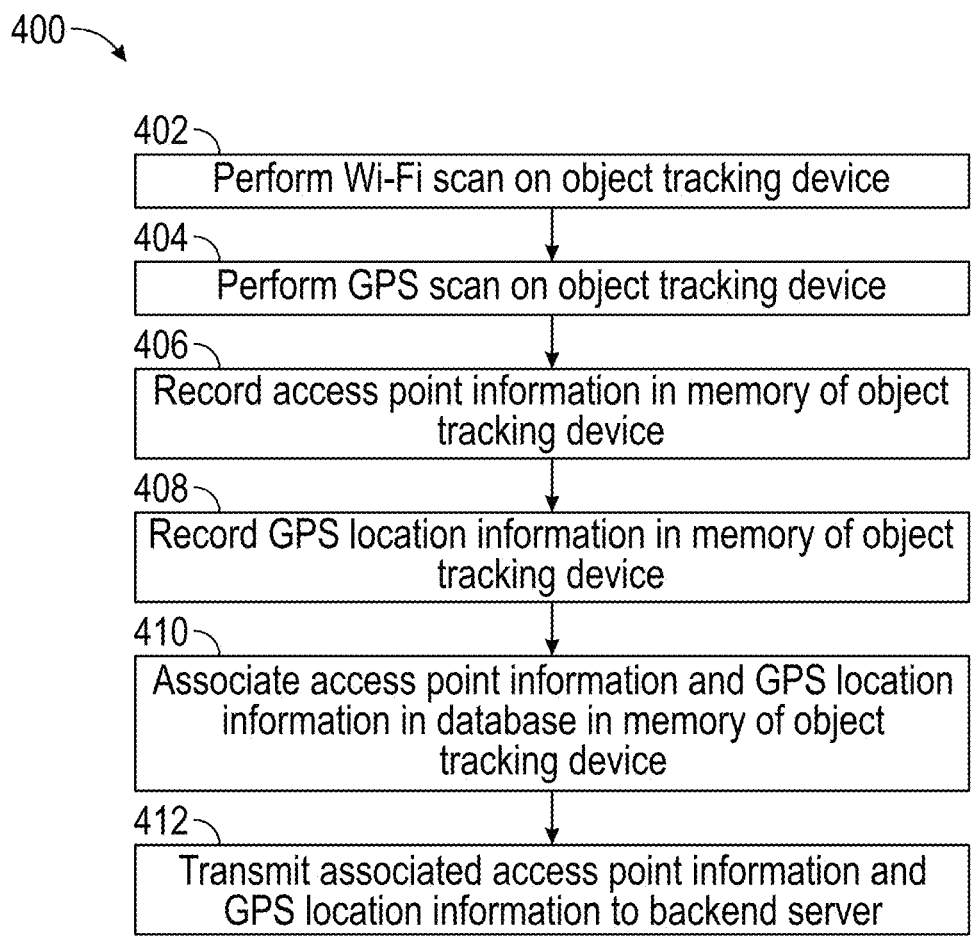
FIG. 4 is a flowchart illustrating a process for updating a location database according to some embodiments.

FIG. 4 is a flowchart illustrating an example process 400 for building an on-device database of access points and locations. The process 400 can be executed on an object tracking device, such as an asset gateway. In the example of FIG. 4, an object tracking device is configured to perform Wi-Fi scans and GPS scans, and to associate determined GPS locations with detected access points. At block 402, an object tracking device can perform a Wi-Fi scan to detect nearby access points. At block 404, the object tracking device can perform a GPS scan to determine the location of the object tracking device. At block 406, the object tracking device can record access point information (e.g., MAC address, BSS, BSSID, channel, signal strength, SSID, and so forth) associated with each access point detected by the Wi-Fi scan at block 402. At block 408, the object tracking device can record the GPS location information determined by GPS scan at block 404. At block 410, the object tracking device can associate the access point information with the GPS location information and store said information in a database in the memory of the object tracking device, for example, in non-volatile memory or in volatile memory. At block 412, the object tracking device can transmit the associated access point information and GPS location information to a backend server, although as discussed above, in some embodiments, object tracking devices may not share the information with a backend server.

In some embodiments, the process 400 can be executed by an asset gateway or other object tracking device when the device does not detect access points nearby that are already in the on-device database, when the asset gateway detects access points that are not in the on-device database, periodically, and so forth. In some embodiments, when the asset gateway detects known and unknown access points, the locations of the known access points can be used to determine locations of unknown access points, instead of or in addition to performing a GPS scan and associating the results of the GPS scan with the unknown access points. Thus, an unknown access point can have a location associated therewith without performing a GPS scan. In some embodiments, an access point can be considered unknown until it has been detected a threshold number of times, for example one time, two times, three times, or more. This can be desirable because some access points may move over time (for example, an access point located on a truck or other moveable equipment), a determined GPS location may be inaccurate, and so forth.

Figure 5:
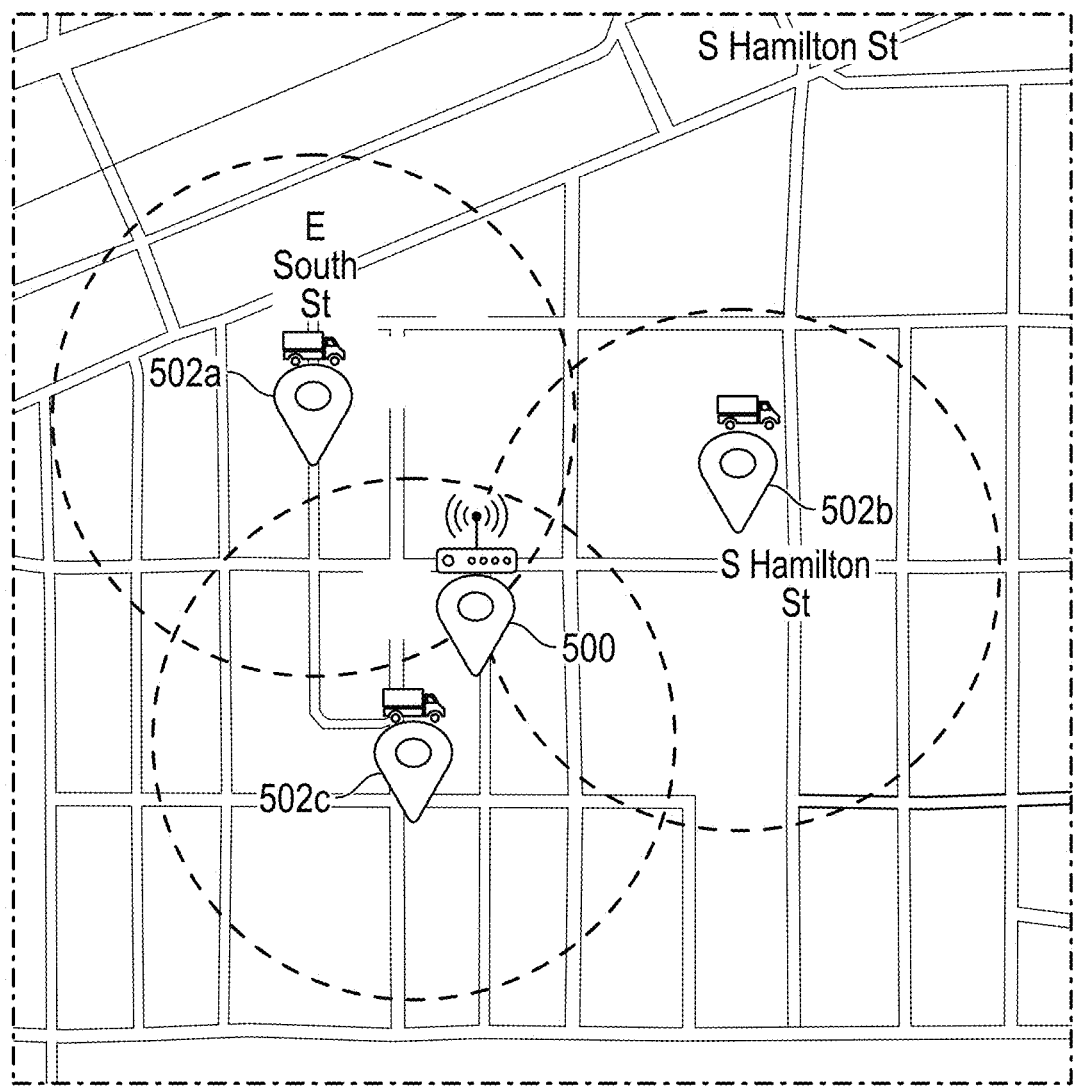
FIG. 5 is an example diagram showing location determination for an access point according to some embodiments.

FIG. 5 is an example diagram showing location determination of a Wi-Fi access point according to some embodiments. A database can comprise entries of access point names (e.g., SSIDs and/or MAC addresses) and/or other identifying information and can have locations associated with each access point. The data can contain one or more location entries for each Wi-Fi access point. As shown in FIG. 5, a Wi-Fi access point 500 can be detected by an object tracking device (e.g., an asset gateway, vehicle gateway, etc.) when the object tracking device is at locations 502a, 502b, and 502c. For example, the object tracking device may be located on a truck or other movable object. The object tracking device can comprise a database that stores information about the access point 500 and that associates the locations 502a-502c with the access point 500. The object tracking device can calculate a location of the access point 500 by, for example, determining the geometric mean of the locations 502a-502c. In some embodiments, additional information can be used to more precisely locate the access point 500. For example, in some embodiments, information about the signal strength of the access point 500 can be used. For example, if the access point 500 is far away from a location, the signal strength at that location can be relatively weak compared to the signal strength at another, different, location that is close to the access point.

Figure 6:
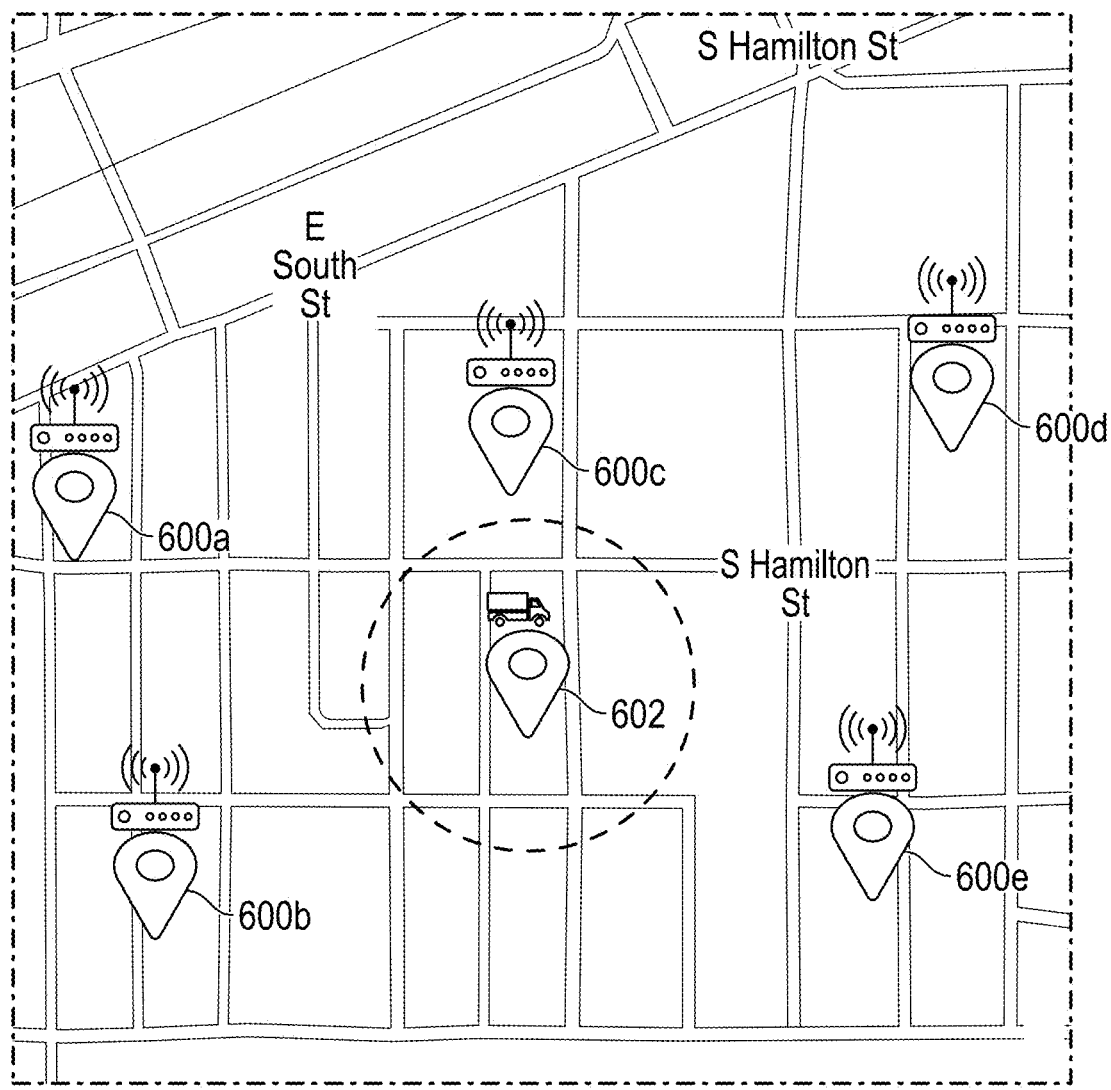
FIG. 6 is an example diagram showing location determination for an object tracking device according to some embodiments.

FIG. 6 is an example diagram showing location determination of an object tracking device using nearby Wi-Fi access points according to some embodiments. As shown in FIG. 6, access points 600a-600e can be within range of an object tracking device 602, such as an asset gateway or vehicle gateway on a vehicle, piece of cargo, piece of equipment, and so forth. The object tracking device 602 can detect the nearby access points 600a-600e by performing a Wi-Fi scan (which can be all available channels or a subset of channels). The object tracking device 602 can use information about the nearby access points 600a-600e to query a database on the object tracking device and determine the locations of the access points 600a-600e. In some embodiments, the object tracking device 602 can determine its location as the average of the geometric means of the locations associated with each access point. That is, each access point can have a location determined as the geometric mean of locations for the access point (e.g., as described above with reference to FIG. 5), and the location of the object tracking device 602 can be the average of the locations of the access points 600a-600e. In some embodiments, instead of querying an on-device database, the object tracking device can query an external database, for example a database located on a cloud or backend server. In some embodiments, the object tracking device can send information associated with the nearby access points 600a-e to a cloud or backend server, and the backend server can determine the location based on the received access point information.

While it can be advantageous to have a large number of nearby access points available for determining the location of an object tracking device, in some cases it may be desirable to exclude an access point from location calculations. For example, an access point that moves around over time (e.g., an access point located on a vehicle) can be excluded, or access points that are far from an object tracking device can be excluded. Excluding access points that are far away or that have unreliable or unstable locations can improve the accuracy and/or precision of a determined location of the object tracking device.

Figure 7:
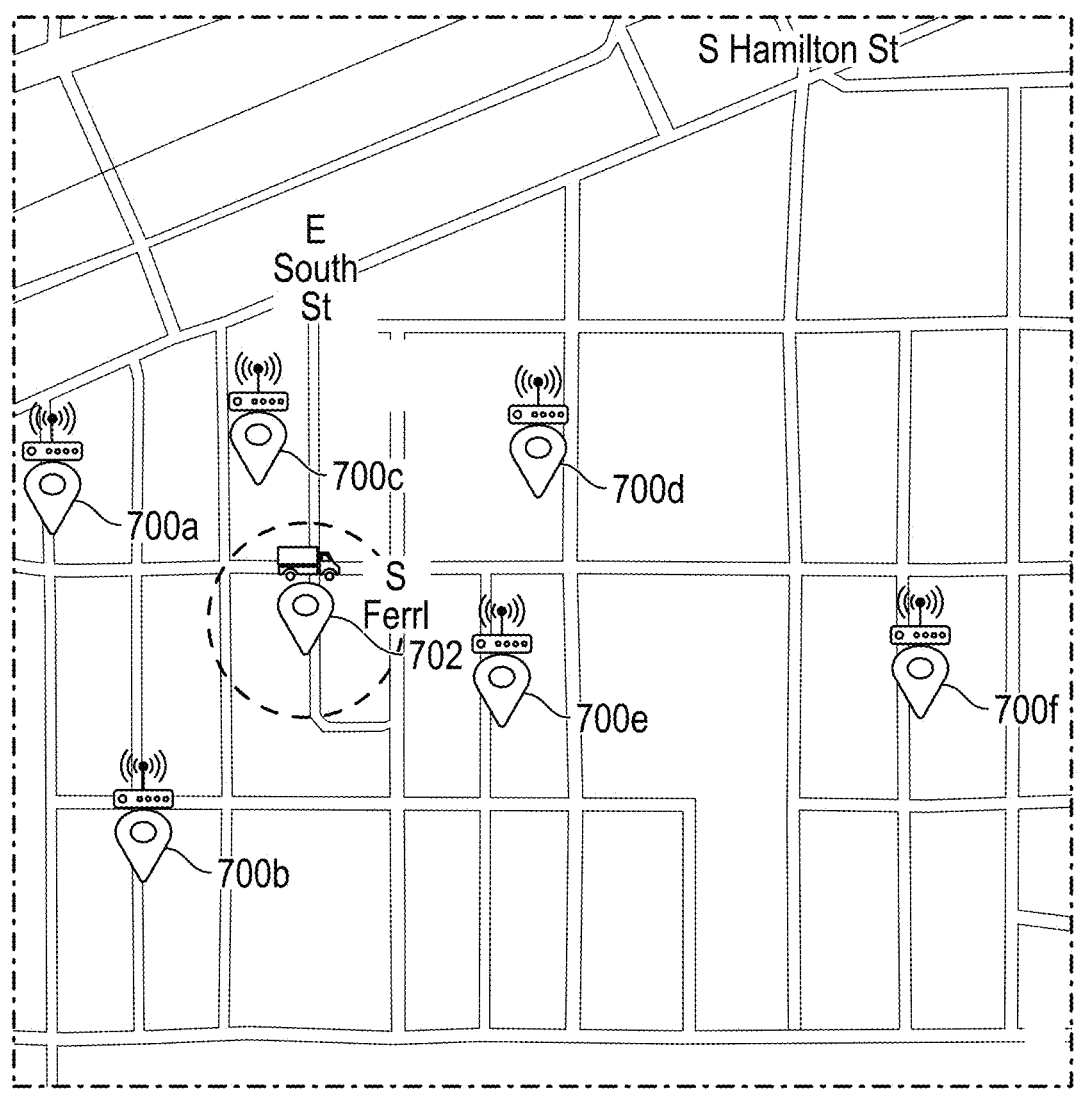
FIGS. 7-8B are example diagrams showing access point exclusion according to some embodiments.

FIG. 7 is an example diagram showing location determination of an object device using nearby Wi-Fi access points according to some embodiments. As shown in FIG. 7, an object tracking device 702 (e.g., an asset gateway or vehicle gateway) can have access points 700a-f within range of the object tracking device 702. The access points 700a-e can be relatively close to the object tracking device, while the access point 700f can be relatively far from the object tracking device and/or from the other access points 700a-e. In some embodiments, the object tracking device 702 can be configured to exclude certain access points when they are more than a threshold distance away from other nearby access points. For example, if the location of an access point is more than a threshold distance from the average location of the nearby access points, that access point can be excluded. Thus, for example, the access points 700a-e may be included in a calculation of the location of the object tracking device 702, while access point 700f may be excluded because it is too far away. In some embodiments, the threshold distance can depend on the number of nearby access points. For example, if there are many access points nearby, the threshold distance may be relatively small, while if there are few access points nearby, the threshold may be relatively large so that more access points are included in the location determination, even if some of those access points are relatively far away.

As mentioned briefly above, in some cases an access point may move around, or its location may otherwise be uncertain. In some cases, it can be desirable to exclude such access points. For example, an access point may be installed in a truck, may be a portable Wi-Fi hotspot such as a smartphone or dedicated hotspot device, and so forth.

Figure 8A:
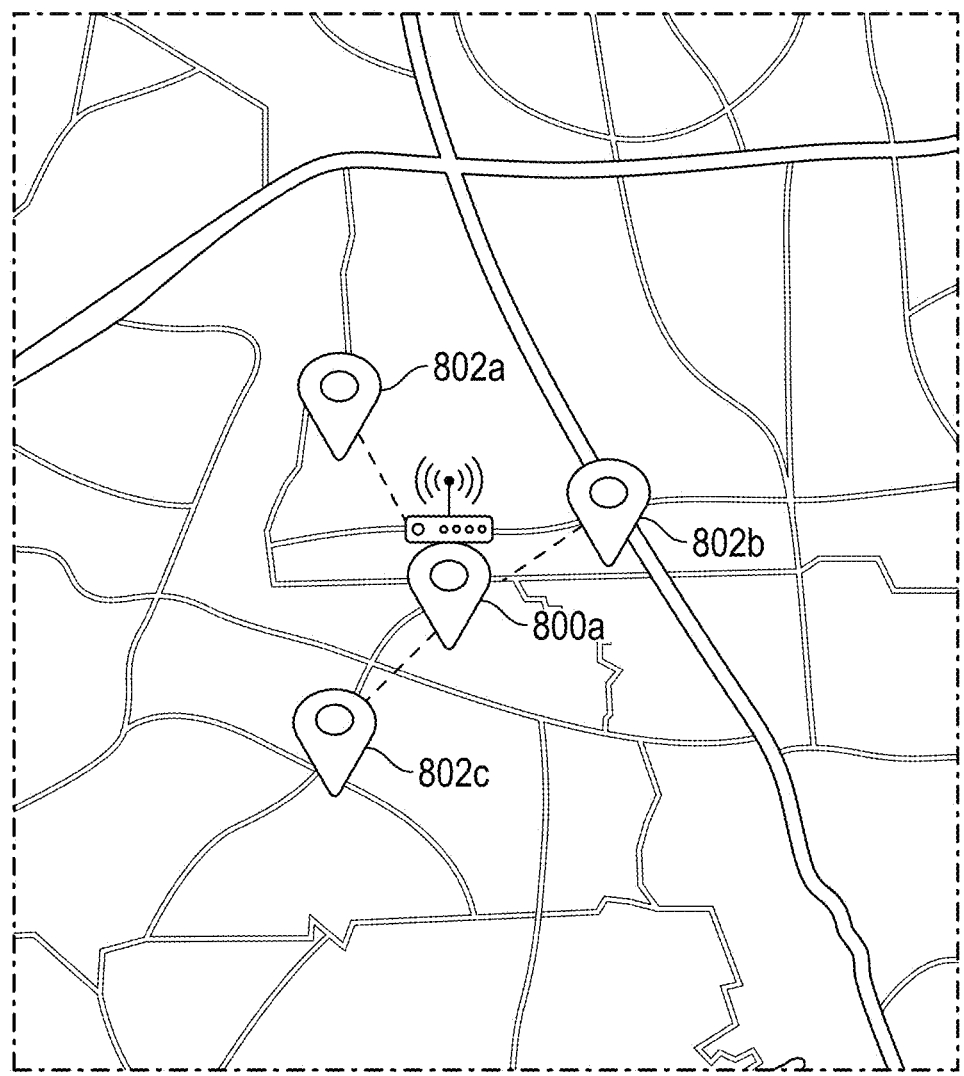
Figure 8B:
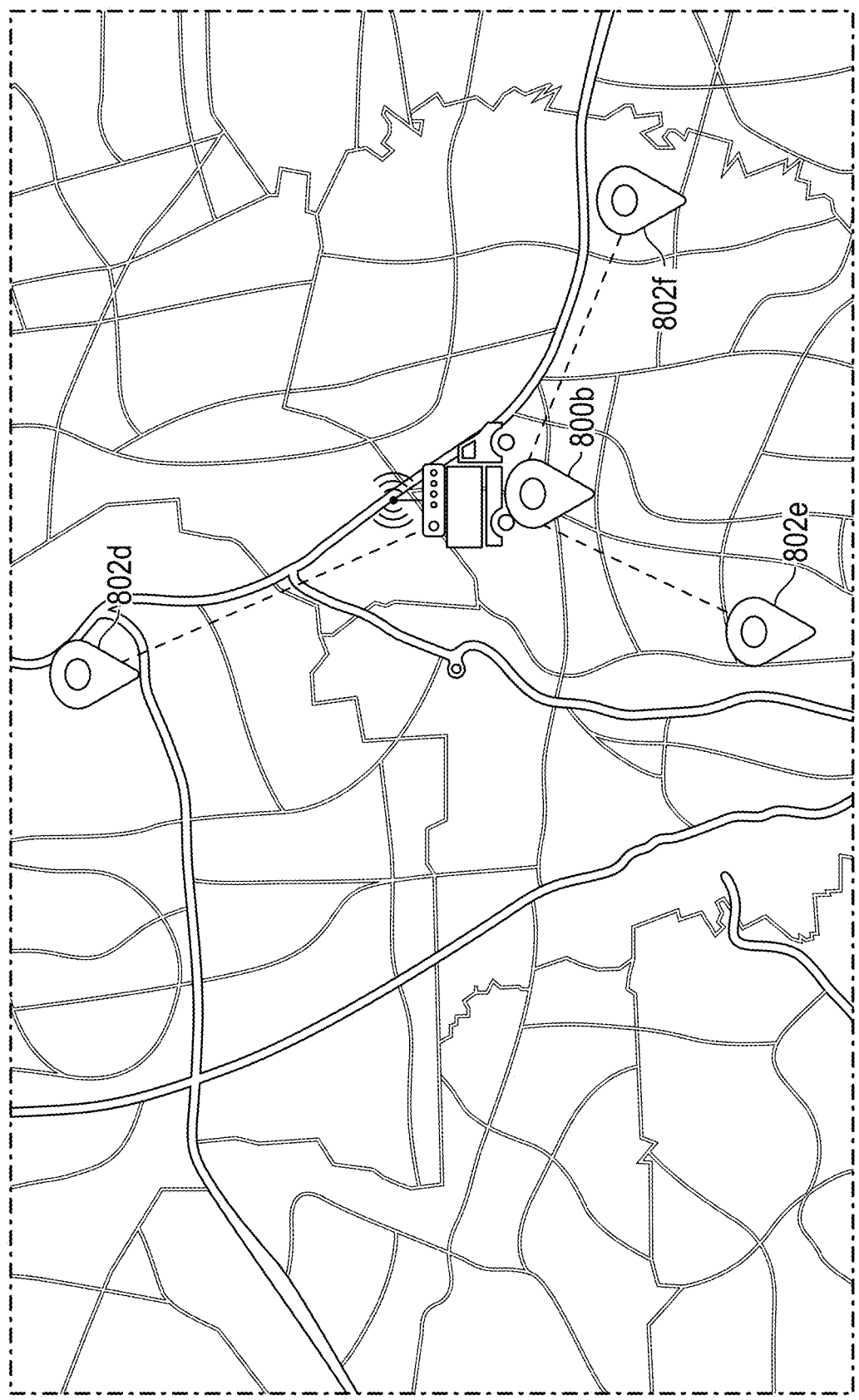

FIGS. 8A and 8B are example diagrams that illustrate exclusion of an access point according to some embodiments. In FIG. 8A, a first access point 800a can be detected at different times by an object tracking device at locations 802a-c. The locations 802a-c can be sufficiently close to each other, and the access point 800a can be used for determining the location of object tracking devices. In contrast, in FIG. 8B, a second access point 800b can be detected by an object tracking device at locations 802d-f. The locations 802d-f can be relatively far apart compared to the locations 802a-c, and the access point 800b can be excluded from location calculations. In some cases, the standard deviation of the locations at which an access point is detected can be used to determine whether or not the access point should be included in location calculations. A large standard deviation may indicate, for example, that the access point is located on a moving vehicle or otherwise has an unstable location. For example, if the standard deviation in the locations of an access point is above a threshold amount, the access point may be excluded from location calculations for an object tracking device, or may only be used under certain conditions, such as when there are few (e.g., less than some threshold value) detected access points nearby. In some embodiments, an exclusion threshold can be related to the range of a Wi-Fi router. For example, a Wi-Fi router may have an outdoor range of about 300 m, about 150 m, about 50 m, about 24 m, or any number between and including these ranges.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A battery powered object tracking device comprising:
   a GPS receiver configured to detect GPS signals from GPS satellites;
   a Wi-Fi transceiver configured to wirelessly communicate with Wi-Fi access points;
   a short-range communication transceiver configured to wirelessly communicate via a short-range communication protocol;
   a computer readable storage medium having program instructions embodied therein; and
   one or more processors configured to execute the program instructions to cause the object tracking device to:
      perform, by the short-range communication transceiver, a scan for one or more location aware devices configured to determine geographic locations of respective devices;
      in response to establishing communication with a first location aware device, initiate transmission to a backend server, by the first location aware device, of a current geographic location of the first location aware device with an indication that the object tracking device is nearby, wherein the object tracking device preserves battery power by not activating the Wi-Fi transceiver or the GPS receiver;
      in response to failing to identify a location aware device, perform, using the Wi-Fi transceiver, a Wi-Fi access point scan;
      in response to establishing communication with a first Wi-Fi access point, initiate transmission to a backend server, of an identifier of the first Wi-Fi access point, wherein the backend server is configured to lookup the identifier in a database of Wi-Fi access point identifiers and associated geographic locations; and
      in response to failing to identify a location aware device, failing to identify a Wi-Fi access point, and determining that a geographic location of the object tracking device has not been provided to the backend server for more than a threshold amount of time, activate the GPS receiver and determine a geolocation based on detected GPS signals by the GPS receiver of the object tracking device and transmit the geolocation to the backend server.

2. The object tracking device of claim 1, wherein an amount of power required by the GPS receiver is greater than an amount of power required by the Wi-Fi transceiver, which is greater than an amount of power required by the short-range communication transceiver.

3. The object tracking device of claim 1, wherein the short-range communication transceiver is configured to wirelessly communicate via Bluetooth.

4. The object tracking device of claim 1, wherein the location aware device is a vehicle gateway.

5. The object tracking device of claim 1, further comprising:
   a cellular transceiver configured to wirelessly communication with cellular base stations,
   wherein the computer readable storage medium further has instructions embodied therein that, when executed by the one or more processors, cause the object tracking device to:
      in response to failing to identify a location aware device, failing to identify a Wi-Fi access point, and failing to determine a geolocation based on detected GPS signals, determine an approximate location based on one or more cellular base stations within a communication range of the object tracking device and transmit the approximate location to the backend server.

6. The object tracking device of claim 1, wherein the computer readable storage medium further has instructions embodied therein that, when executed by the one or more processors, cause the object tracking device to determine if a location reporting condition is satisfied.

7. The object tracking device of claim 6, wherein the location reporting condition comprises any combination of one or more of: a threshold amount of movement since a last reported location, a time since the last reported location, a time since a last connection to a cloud server, and a time since a last connection to a location aware device.

8. The object tracking device of claim 6, wherein to determine if the location reporting condition is satisfied, the computer readable storage medium further has instructions embodied therein that, when executed by the one or more processors, cause the object tracking device to:

determine that the object tracking device has not experienced more than a threshold amount of movement since the location of the object tracking device was last reported;

determine that the object tracking device has determined a GPS location in a first threshold amount of time; and determine that the object tracking device was not connected to a plugged in tracking device in a second threshold amount of time.

9. The object tracking device of claim 8, wherein the first threshold amount of time is 48 hours.

10. The object tracking device of claim 1, wherein the object tracking device is further configured to report an identifier of at least one unknown Wi-Fi access point.

11. The object tracking device of claim 1, wherein the database of Wi-Fi access point identifiers and associated geographic locations includes at least one field indicative of entities associated with the Wi-Fi access point identifiers, and wherein looking up the identifier fails if an entity associated with the object tracking device is not associated with the Wi-Fi access point.

12. A computerized method, performed by a battery-powered object tracking device having one or more hardware computer processors and one or more non-transitory computer readable storage device storing software instructions executable by the object tracking device to perform the computerized method comprising:

performing, by a short-range communication transceiver, a scan for one or more location aware devices configured to determine geographic locations of respective devices;

in response to establishing communication with a first location aware device, initiating transmission to a backend server, by the first location aware device, of a current geographic location of the first location aware device with an indication that the object tracking device is nearby, wherein the object tracking device preserves battery power by not activating a Wi-Fi transceiver or a GPS receiver of the object tracking device;

in response to failing to identify a location aware device, performing, using the Wi-Fi transceiver, a Wi-Fi access point scan;

in response to establishing communication with a first Wi-Fi access point, initiate transmission to a backend server, of an identifier of the first Wi-Fi access point, wherein the backend server is configured to lookup the identifier in a database of Wi-Fi access point identifiers and associated geographic locations; and in response to failing to identify a location aware device, failing to identify a Wi-Fi access point, and determining that a geographic location of the object tracking device has not been provided to the backend server for more than a threshold amount of time, activating the GPS receiver and determining a geolocation based on detected GPS signals by the GPS receiver of the object tracking device and transmit the geolocation to the backend server.

13. The computerized method of claim 12, wherein an amount power required by the GPS receiver is greater than an amount of power required by the Wi-Fi transceiver, which is greater than an amount of power required by the short-range communication transceiver.

14. The computerized method of claim 12, wherein the short-range communication transceiver is configured to wirelessly communicate via Bluetooth.

15. The computerized method of claim 12, wherein the location aware device is a vehicle gateway.

16. The computerized method of claim 12, further comprising:

in response to failing to identify a location aware device, failing to identify a Wi-Fi access point, and failing to determine a geolocation based on detected GPS signals, determining an approximate location based on one or more cellular base stations within a communication range of the object tracking device and transmit the approximate location to the backend server.

17. The computerized method of claim 12, further comprising:

determining if a location reporting condition is satisfied.

18. The computerized method of claim 17, wherein the location reporting condition comprises any combination of one or more of: a threshold amount of movement since a last reported location, a time since the last reported location, a time since a last connection to a cloud server, and a time since a last connection to a location aware device.

19. The computerized method of claim 17, wherein to determine if the location reporting condition is satisfied, the method further comprises:

determining that the object tracking device has not experienced more than a threshold amount of movement since the location of the object tracking device was last reported;

determining that the object tracking device has determined a GPS location in a first threshold amount of time; and determine that the object tracking device was not connected to a plugged in tracking device in a second threshold amount of time.

* * * * *